United States Patent
Ibert et al.

(10) Patent No.: US 9,040,654 B2
(45) Date of Patent: *May 26, 2015

(54) PROCESS FOR MANUFACTURING POLYCARBONATE FROM DIANHYDROHEXITOL DIALKYLCARBONATE

(75) Inventors: Mathias Ibert, La Chapelle d'armentieres (FR); Emilie Josien, St Venant (FR); Herve Wyart, Cuinchy (FR)

(73) Assignee: ROQUETTE FRERES, Lestrem (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/110,292

(22) PCT Filed: Apr. 5, 2012

(86) PCT No.: PCT/FR2012/050748
§ 371 (c)(1),
(2), (4) Date: Oct. 7, 2013

(87) PCT Pub. No.: WO2012/136942
PCT Pub. Date: Oct. 11, 2012

(65) Prior Publication Data
US 2014/0031517 A1     Jan. 30, 2014

(30) Foreign Application Priority Data
Apr. 5, 2011   (FR) ..................... 11 52950

(51) Int. Cl.
| | | |
|---|---|---|
| *C08G 64/00* | (2006.01) | |
| *C08G 64/02* | (2006.01) | |
| *C08G 64/30* | (2006.01) | |
| *C08G 75/00* | (2006.01) | |

(52) U.S. Cl.
CPC .......... *C08G 64/0208* (2013.01); *C08G 64/305* (2013.01)

(58) Field of Classification Search
USPC .................................... 528/370, 371
See application file for complete search history.

(56) References Cited

U.S. PATENT DOCUMENTS

| 2004/0241553 A1 | 12/2004 | Abe et al. |
| 2010/0196720 A1 | 8/2010 | Kato et al. |
| 2012/0041169 A1 | 2/2012 | Fuertes et al. |

FOREIGN PATENT DOCUMENTS

| EP | 2 033 981 A1 | 3/2009 |
| JP | 6261774 A | 9/1994 |
| JP | 2003292603 A | 10/2003 |
| WO | 2011/039483 A1 | 4/2011 |

OTHER PUBLICATIONS

Saber Chatti et al. "Cyclic and Noncyclic Polycarbonates of Isosorbide (1,4:3,6-dianhydro-D-glucitol)", in Macromolecules, 2006, 9061-9070, Macromolecules, vol. 39, No. 26, Dec. 1, 2006, pp. 9064-9070, XP055009118, ISSN: 0024-9297, DOI: 10.1021/ma0606051 Schema I;tables 2-4; compounds Lb, Lc.

International Search Report, dated Jun. 5, 2012, from corresponding PCT application.

*Primary Examiner* — Terressa Boykin
(74) *Attorney, Agent, or Firm* — Young & Thompson

(57) ABSTRACT

A process for manufacturing a polycarbonate, having a glass transition temperature greater than or equal to 50° C., includes: a step (1) of introducing into a reactor a monomer of formula (I) and R1 and R2 being identical or different alkyl groups; a step (2) of introducing into the reactor at least one cyclic diol or a mixture of diols (B) including at least 20 mol % of cyclic diols; a subsequent step (3) of polycondensation via transesterification of the mixture of monomers including the monomers (A) and (B); a step (4) of recovering the polycarbonate formed during step (3).

20 Claims, No Drawings

PROCESS FOR MANUFACTURING POLYCARBONATE FROM DIANHYDROHEXITOL DIALKYLCARBONATE

FIELD OF THE INVENTION

The invention relates to a novel process for manufacturing polycarbonate having the advantages which will be described below, and to the polycarbonate that may be obtained via this process.

TECHNICAL PROBLEM

The development of polymers derived from short-term renewable biological resources has become an ecological and economical imperative, in the face of the depletion and the rise in prices of fossil resources such as petroleum.

In this context, the use of dianhydrohexitols, derived from plant (poly)saccharides, as dihydroxylated monomers for the manufacture of polymers by polycondensation, appears to be a promising approach for replacing monomers of petrochemical origin.

Among these polymers, polycarbonates are amorphous thermoplastic materials that have advantageous properties, in particular advantageous mechanical or optical properties. Conventionally, they are obtained by polycondensation of diols and of diphenyl carbonate, phosgene or diphosgene.

By way of example, the preparation of polycarbonates based on dianhydrohexitols was described in patent application EP 2 033 981 A1. Said document describes the polycondensation of a mixture of isosorbide, of at least a second alicyclic diol and of diphenyl carbonate.

The process has the drawback of generating phenol, which is a toxic compound, in large amounts as a byproduct of the polymerization reaction.

Another example of a process for manufacturing isosorbide-based polycarbonate is also described in the article by Saber CHATTI, entitled "Cyclic and Noncyclic Polycarbonates of Isosorbide (1,4:3,6-dianhydro-D-glucitol)", in Macromolecules, 2006, 9061-9070. The only processes that effectively enable the manufacture of polycarbonate themselves use reagents or solvents that are toxic, or even very toxic, such as phosgene, diphosgene, pyridine or bis-chloroformate.

Mention may also be made of patent application US 2004/0 241 553 A1 which describes an ion-conducting electrolyte, based on a compound comprising dianhydrohexitol carbonate groups and an electrolyte salt. The electrolyte compound based on dianhydrohexitol carbonate may optionally be a polymer.

An intermediate for the manufacture of this electrolyte compound, described in formula (6) of said document, is chosen from certain dianhydrohexitol dialkyl carbonates and dianhydrohexitol diphenyl carbonate. However, according to the variant in which this compound is a polymer, it is always manufactured from dianhydrohexitol diphenyl carbonate.

The process for manufacturing this polymer compound also generates phenol.

The polymer is obtained by copolymerization with a monomer chosen from aliphatic diols and oligomeric ethers. This results in a flexible polymer, this flexibility being a necessary condition for obtaining good ion conductivity of the electrolyte.

Although it is known, for example from document US 2010/196 720, that polycarbonates can be manufactured by reacting dialkyl carbonates with isosorbide and a cyclic diol, the Applicant has observed that the yields obtained via these processes are generally unsatisfactory (see the examples).

There is thus still a need at the present time to find novel routes for manufacturing polycarbonates that are rigid at room temperature.

By the expression "polycarbonate that is rigid at room temperature" the Applicant means a polycarbonate with a glass transition temperature of greater than or equal to 50° C.

In particular, it is advantageous to find processes which generate compounds that are less toxic than those usually generated in the standard synthetic processes.

It is also advantageous for this process to use sparingly toxic reagents.

In the course of its research, the Applicant has succeeded in developing a novel process for obtaining polycarbonate comprising units derived from particular dianhydrohexitol derivatives, said polycarbonate having a rigid nature, while at the same time satisfying at least one of the problems outlined above.

Specifically, by using the process according to the invention, it is possible to not generate any phenol during the manufacturing process, but less toxic alcohols.

Furthermore, the process also makes it possible to dispense with the use of toxic reagents such as phosgene and derivatives thereof.

This novel process comprises a polycondensation reaction by transesterification between a dianhydrohexitol derivative of alkyl dicarbonate type and a cyclic diol. The polycarbonates thus formed may be used in any type of application, including the most demanding applications.

SUMMARY OF THE INVENTION

One subject of the invention is thus a process for manufacturing a polycarbonate with a glass transition temperature of greater than or equal to 50° C., comprising:
 a step (1) of introducing, into a reactor, a monomer (A) of formula:

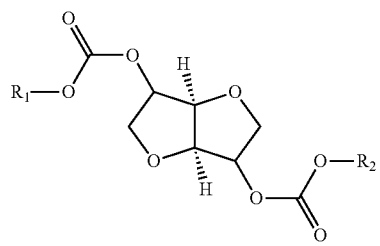

R1 and R2 being identical or different alkyl groups;
 a step (2) of introducing, into the reactor, at least one cyclic diol or a mixture of diols (B) comprising at least 20 mol % of cyclic diols;
 a subsequent step (3) of polycondensation by transesterification of the monomer mixture comprising monomers (A) and (B);
 a step (4) of recovering the polycarbonate formed in step (3).

Surprisingly, the Applicant has managed to find a novel process for manufacturing polycarbonates that are rigid at room temperature, having the advantages already outlined. In particular, this process makes it possible to obtain an improved yield relative to the processes already described using a dianhydrohexitol and a dialkyl carbonate in place of the monomer (A).

The alkyl groups R1 and R2 borne by (A) may comprise from 1 to 10 carbon atoms, advantageously from 1 to 6, for example from 1 to 4, and are most particularly chosen from methyl and ethyl groups.

Advantageously, (B) is a mixture of diols comprising, relative to the total number of diols, at least 50 mol % of a cyclic diol or of a mixture of cyclic diols, preferentially at least 80%, and most preferentially consists of a cyclic diol or a mixture of cyclic diols.

Preferentially, the cyclic diol(s) are chosen from:
- bisphenols such as 2,2-bis(4-hydroxyphenyl)propane (bisphenol A), 2,2-bis(3,5-dimethyl-4-hydroxyphenyl) propane, bis(4-hydroxyphenyl)methane (bisphenol F), 1,1-bis(4-hydroxyphenyl)cyclohexane (bisphenol C) and 1,1-bis(4-hydroxyphenyl)ethane (bisphenol AD);
- dianhydrohexitols such as isosorbide, isomannide and isoidide;
- cyclohexanedimethanols such as 1,2-cyclohexanedimethanol, 1,3-cyclohexanedimethanol and 1,4-cyclohexanedimethanol;
- tricyclodecanedimethanols;
- pentacyclopentanedimethanols;
- decalindimethanols such as 2,6-decalindimethanol, 1,5-decalindimethanol and 2,3-decalindimethanol;
- norbornanedimethanols such as 2,3-norbornanedimethanol and 2,5-norbornanedimethanol;
- adamantanedimethanols such as 1,3-adamantanedimethanol;
- cyclohexanediols such as 1,2-cyclohexanediol, 1,3-cyclohexanediol and 1,4-cyclohexanediol;
- tricyclodecanediols;
- pentacyclopentadecanediols;
- decalindiols;
- norbornanediols;
- and adamantanediols.

The cyclic diol is preferably nonaromatic. Preferentially, the cyclic diol is chosen from isosorbide, isomannide and isoidide, 1,2-cyclohexanedimethanol, 1,3-cyclohexanedimethanol and 1,4-cyclohexanedimethanol, preferentially isosorbide.

Advantageously, (A) is an isosorbide dialkyl carbonate.

According to a variant of the process according to the invention, it comprises a step (1') of introducing a monomer (C) of formula:

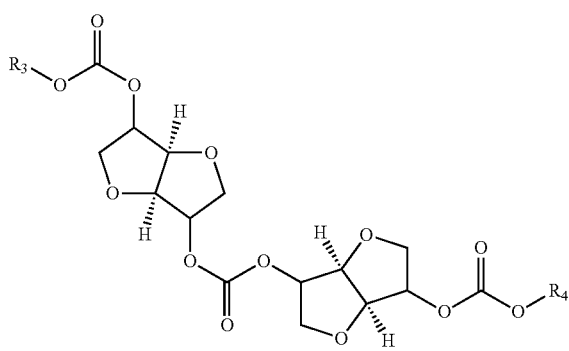

R3 and R4 being identical or different alkyl groups comprising, for example, from 1 to 10 carbon atoms, advantageously from 1 to 6 and preferentially from 1 to 4, and are most particularly chosen from methyl and ethyl groups.

The molar amounts of monomers (A), (B) and (C) introduced are advantageously, relative to their total number:

from 1% to 60% of (A), preferentially from 39% to 59%;
from 40% to 60% of (B);
and from 0% to 39% of (C), preferentially from 1% to 10%, the sum of (A), (B) and (C) being 100%.

Preferentially, (A), (B) and (C) constitute more than 90 mol % of the total amount of monomers introduced into the reactor.

The invention relates to a process using a particular mixture of monomers (A), (B) and optionally (C). The type and conditions of transesterification condensation are not particularly limited.

However, step (3) is advantageously performed in the presence of a known catalyst for polycondensation by transesterification, advantageously a catalyst comprising at least one alkali metal or alkaline-earth metal ion, a quaternary ammonium ion, a quaternary phosphonium ion, a cyclic nitrogen compound, a basic boron-based compound or a basic phosphorus-based compound.

Preferentially, the catalyst is chosen from catalysts comprising at least one alkali metal ion, catalysts comprising a cyclic nitrogen compound and catalysts comprising a quaternary ammonium ion, such as cesium carbonate, triazoles or tetramethylammonium hydroxide, most preferentially cesium carbonate.

The molar amount of optional catalyst, relative to the amount of (A) and of optional (C), advantageously ranges from $10^{-7}$% to 1% and preferentially from $10^{-4}$% to 0.5%.

Advantageously, step (3) of the process according to the invention is performed under an inert atmosphere, for example under nitrogen.

At least part of step (3) of the process according to the invention may be performed at a temperature ranging from 100° C. to 250° C., and preferentially from 150 to 235° C.

According to an advantageous embodiment of the process, at least part of step (3) is performed at a pressure ranging from 30 kPa to 110 kPa, advantageously from 50 to 105 kPa and preferentially from 90 to 105 kPa, for example at atmospheric pressure.

Specifically, according to the standard processes, the transesterification condensation reaction must be formed under a relatively high vacuum, generally at a maximum pressure of 20 kPa, in order to be able to perform it satisfactorily. The process of the invention has the advantage of working under a relatively light vacuum.

The polycarbonate recovered in step (4) advantageously has a glass transition temperature ranging from 90 to 180° C., for example from 110 to 170° C. The polycarbonate may reach this glass transition temperature when (A) is an isosorbide dialkyl carbonate and (B) is a diol composition comprising at least 80% isosorbide.

The polycarbonate may have a Young's modulus at 25° C. ranging from 1000 to 4000 MPa. It advantageously has a weight-average molar mass of greater than or equal to 5000 g/mol, preferentially ranging from 8000 to 200 000 g/mol. As explained hereinbelow in the detailed description, a person skilled in the art can vary the glass transition temperature of the polycarbonate especially by appropriately selecting (B).

The invention will now be described in greater detail hereinbelow.

DETAILED DESCRIPTION OF THE INVENTION

According to the present invention, the term "polycarbonate" means any polymer comprising repeating units formed by the reaction of monomers linked via carbonate bonds, and in particular the repeating units described above. These repeating units are formed by reaction of (A) and (B) already presented.

The polycarbonate may contain only repeating units linked via carbonate bonds; it may also be a copolymer containing repeating units linked via carbonate bonds and repeating units linked via other bonds such as carboxylic acid ester or urethane bonds.

In the present patent application, the term "monomer" means a compound containing at least two functions that are capable of reacting with an alcohol function or an alkyl carbonate function in a transesterification condensation reaction.

When they are combined with the term "monomer" or "dimer", the numbers "one", "two" or "more" mean in the present patent application the number of monomers of different types. By way of example, when the term "monomer" or "diol" is used in the singular, this obviously does not mean that only one molecule is introduced or reacts, but that several molecules of the same type are introduced or reacted.

As explained previously, the invention relates to a process for manufacturing polycarbonate by polycondensation of monomers (A) and (B).

The monomer (C) may also be introduced according to a variant. (C) may be a dimer of (A). Depending on the dianhydrohexitol used, one or more conformations of dimers (C) may be obtained.

(A) is placed in the reactor during the introduction step (1). Monomer (A) may be chosen from isosorbide dialkyl carbonate, isomannide dialkyl carbonate and isoidide dialkyl carbonate.

Monomer (A) may be obtained by using, for example, the already-known processes for manufacturing dianhydrohexitol dialkyl carbonate.

It is possible, for example, to manufacture monomer (A) by reacting dianhydrohexitol and an alkyl chloroformate, these reagents being introduced into a reactor in mole proportions of 1:2. This type of process is described, for example, in document JP 6-261774 in example 5. The Applicant has observed that, according to this process, only dianhydrohexitol dialkyl carbonate is formed, and no dimer.

Monomer (C) may by manufactured by reacting, for example, in a first step one mole of dianhydrohexitol with one mole of alkyl chloroformate so as to form dianhydrohexitol monoalkyl carbonate, and then in a second step one mole of phosgene with two moles of dianhydrohexitol monoalkyl carbonate formed in the first step.

One possibility for manufacturing monomers (A) and (C) is to use a process that enables their simultaneous synthesis. Specifically, the Applicant has also developed a process for manufacturing such a mixture. This process is described in detail in international patent application PCT/FR2010/052066.

This preparation process comprises, in the following order, the following steps:
  (a) preparation of an initial reaction mixture containing
    at least one dianhydrohexitol,
    at least two molar equivalents, relative to the amount of dianhydrohexitol present, of at least one dialkyl carbonate, and
    a transesterification catalyst, for instance potassium carbonate,
  (b) heating the reaction mixture to a temperature greater than or equal to the boiling point of the alcohol R—OH formed by the transesterification reaction, or greater than or equal to the boiling point of the azeotropic mixture formed by the alcohol R—OH obtained with another of the components present in the reaction mixture, and at most equal to the boiling point of the reaction mixture, in a reactor equipped with a rectification column comprising a number of theoretical distillation plates that is sufficient to separate from the reaction mixture the alcohol obtained, or the azeotrope which it forms with another of the components present in the reaction mixture.

The solution obtained at the end of the process comprises a mixture of monomers (A) and (C) with dialkyl carbonate. Distillation is performed and the mixture of (A) and (C) free of dialkyl carbonate is recovered.

The ratio (A)/(C) may be varied by modifying the initial reaction mixture: this mixture advantageously contains from 2.1 to 100 molar equivalents, preferably from 5 to 60 molar equivalents and in particular from 10 to 40 molar equivalents of dialkyl carbonate, relative to the amount of dianhydrohexitol initially present in the reaction medium. The higher the amount of dialkyl carbonate, the higher the ratio (A)/(C) in the solution of monomers obtained.

For example, the Applicant has found that by reacting isosorbide and dimethyl carbonate in the presence of potassium carbonate under the conditions of the process described above, a solution of monomers comprising (A) and (C) with a ratio (A)/(C) ranging from about 4 (when the dialkyl carbonate/isosorbide ratio is 10) to about 20 (when the dialkyl carbonate/isosorbide ratio is 40) could be obtained.

The monomers (A) and (C) may then be separated via vacuum distillation techniques, for example using a scraped-film evaporator.

This process for the simultaneous synthesis of (A) and (C) has the advantages of using reagents that are less toxic than the alkyl chloroformate used in the process described in document JP 6-261774, for example; the synthetic coproducts are also less toxic than the chlorinated species emitted during the synthesis with chloroformate (methanol in the case where the alkyl is a methyl, ethanol in the case where the alkyl is an ethyl).

As regards the monomer (B), it is a cyclic diol, a mixture of cyclic diols or a mixture of diols comprising at least 20 mol % of cyclic diol.

Cyclic diol may comprise one or more rings, for example from 2 to 4 rings, preferentially 2 rings. Each ring preferentially comprises 4 to 10 atoms. The atoms included in the rings may be chosen from carbon, oxygen, nitrogen and sulfur. Preferentially, the constituent atoms of the ring are carbon or carbon and oxygen.

The cyclic diol may be aromatic or nonaromatic.

The aromatic diols preferentially comprise from 6 to 24 carbon atoms.

The nonaromatic cyclic diol may comprise from 4 to 24 carbon atoms and advantageously from 6 to 20 carbon atoms.

According to the variant in which (B) is a mixture of diols comprising at least 20 mol % of cyclic diols, it is possible to use, with the cyclic diol(s), noncyclic diols such as linear or branched alkyl diols. This noncyclic diol may comprise from 2 to 10 carbon atoms, for instance ethylene glycol, 1,3-propanediol, 1,4-butanediol, 1,5-pentanediol, 1,6-hexanediol, 1,7-heptanediol, 1,8-octanediol, 1,9-nonanediol or 1,10-decanediol.

According to the process of the invention, it is possible to introduce monomers other than (A), (B) and optionally (C). It is possible, for example, to introduce monomers comprising more than two alcohol or alkyl carbonate functions. It is also possible to introduce monomers comprising several functions chosen from carboxylic acid, carboxylic acid ester and amine functions or mixtures of these functions. It is also possible to introduce other monomers such as dianhydrohexitol monoalkyl carbonate, and oligomers of (A) with a degree of polymerization of greater than or equal to 3.

It is also possible to introduce other products or alternatively other products such as dianhydrohexitol dialkyl ether, dianhydrohexitol monoalkyl ether or dianhydrohexitol monoalkyl ether monoalkyl carbonate, which may be synthetic coproducts of (A) or (C). It is also possible to introduce chain terminators, which are compounds comprising only one function capable of reacting with an alcohol or carbonate function.

However, on the total amount of monomers introduced into the reactor, it is preferred for the sum of (A), (B) and (C) to constitute more than 90 mol % of the total amount of monomers introduced, advantageously more than 95 mol %, or even more than 99 mol %. Most preferentially, the monomers introduced in the reactor consist essentially of monomers (A), (B) and (C). Obviously, it is preferred to limit the amount of diaryl carbonate and of halogenated monomers introduced, for example to amounts less than 5% of the total number of moles of monomers introduced. In a particularly preferred embodiment, no monomer chosen from diaryl carbonates and halogenated monomers is introduced.

The order of the introduction steps (1), (2) and optionally (1') is unimportant. Step (1) may be performed before step (2), or vice versa. It is also possible to perform these two steps simultaneously.

According to one variant, a premix of monomers (A), (B) and optionally (C) is prepared before introducing them into the reactor. When the optional monomer (C) is used in the process, it may be introduced as a mixture with (A). This mixture may for example be made directly according to the synthetic process described in international patent application PCT/FR2010/052066.

In the case where mixtures of monomers are introduced, the amount of each of these monomers may be determined via chromatographic methods, for instance gas chromatography (GC).

For example, to determine the amounts of (A) and (C) of a mixture, the amounts of each of the constituents may be measured by GC by performing the analysis in the form of trimethylsilyl derivatives.

The sample may be prepared according to the following method: 500 mg of sample and 50 mg of glucose pentaacetate (internal standard) of known purity are weighed out in a beaker. 50 ml of pyridine are added and the mixture is stirred until dissolution is complete. 1 ml is taken up in a crucible, 0.5 ml of bis(trimethylsilyl)trifluoroacetamide is added and the mixture is then heated at 70° C. for 40 minutes. To produce the chromatogram, a VARIAN 3800 chromatograph may be used, equipped with:
- a column DB1 30 m long and 0.32 mm in diameter with a film thickness of 0.25 µm,
- an injector of 1177 type equipped with a focus liner with glass wool and heated to 300° C. using a split ratio of 30, the helium flow rate being 1.7 ml/min,
- an FID detector heated to a temperature of 300° C. set with a sensitivity of $10^{-11}$.

1.2 µl of the sample may be introduced, in split mode, into the chromatograph, the column being heated from 100° C. to 320° C. with a ramp of 7° C./min and then a stage of 15 min at 320° C. Under these analysis conditions, when (A) is an isosorbide dimethyl carbonate and (C) dimers of (A), (A) has a relative retention time of about 0.74, (C) has a relative retention time ranging from about 1.34 to 1.79, the internal standard having a retention time of about 15.5 minutes.

With the aid of the chromatogram, the mass percentage of each of the constituents may be calculated by determining the area of the corresponding peaks and by calculating, for each constituent, the ratio of the area of the peak corresponding thereto to the total area of all of the peaks (with the exception of the peak for the internal standard).

To allow the formation of the polycarbonate according to the process of the invention, monomer (A) reacts with monomer (B) and optionally (C) via a transesterification reaction, this reaction being performed in a reactor.

This reaction may take place in the absence of catalyst. However, the presence of a suitable catalyst makes it possible to accelerate the reaction and/or to increase the degree of polymerization of the polycarbonate thus formed in step (3).

As regards the transesterification catalyst optionally used in step (3), it may be a catalyst comprising at least one alkali metal or alkaline-earth metal ion, a quaternary ammonium ion, a quaternary phosphonium ion, a cyclic nitrogen compound, a basic boron-based compound or a basic phosphorus-based compound.

As examples of catalysts comprising at least one alkali metal ion, mention may be made of cesium, lithium, potassium or sodium salts. These salts may in particular be carbonates, hydroxides, acetates, stearates, borohydrides, borides, phosphates, alkoxides or phenoxides, and also derivatives thereof.

As catalyst comprising at least one alkaline-earth metal ion, mention may be made of calcium, barium, magnesium or strontium salts. These salts may in particular be carbonates, hydroxides, acetates or stearates, and also derivatives thereof.

As regards the basic boron-based compounds, they are preferentially salts of alkyl or phenyl boron derivatives such as tetraphenylboron.

The catalysts comprising basic phosphorus-based compounds may be phosphines.

The catalysts comprising a quaternary ammonium ion are preferentially hydroxides such as tetramethylammonium hydroxide.

The catalysts comprising a cyclic nitrogen compound are preferentially triazole, tetrazole, pyrrole, pyrimidine, pyrazine, pyridazine, picoline, piperidine, pyridine, aminoquinoline or imidazole derivatives.

Relative to the amount of (A) and optionally (C), the molar amount of catalyst advantageously ranges from $10^{-7}$% to 1% and preferentially from $10^{-4}$% to 0.5%. Its amount may be adjusted as a function of the catalyst used. By way of example, from $10^{-3}$% to $10^{-1}$% of catalyst comprising at least one alkali metal ion is preferentially used.

Additives such as stabilizers may optionally be added to the monomers (A), (B), (C).

The stabilizer may be, for example, a compound based on phosphoric acid such as trialkyl phosphates, based on phosphorous acid such as phosphite or phosphate derivatives, or a salt of these acids, for example, zinc salts; this stabilizer makes it possible to limit the coloration of the polymer during its manufacture. Its use may be advantageous in particular when the polycondensation is performed in the melt. However, the amount of stabilizer is generally less than 0.01% of the total number of moles of monomers (A), (B) and (C).

In the polycarbonate manufacturing process according to the invention, the step of polycondensation of the monomers (A), (B) and optional (C) is performed during step (3). The polymerization type and conditions are not particularly limited.

This reaction may be performed in the melt, i.e. by heating the reaction medium in the absence of solvent. This polymerization may also be performed in the presence of solvent. This reaction is preferably performed in the melt.

This step (3) is performed for a time sufficient to obtain a polycarbonate. Advantageously, the duration of step (3) ranges from 1 hour to 24 hours, for example from to 12 hours. Preferentially, the reactor is heat-regulated during step (3) to a temperature ranging from 100° C. to 250° C. and preferentially from 150° C. to 235° C.

It is possible to perform all of step (3) at an isotherm. However, it is generally preferred to increase the temperature during this step, either in temperature stages, or by using a temperature ramp. This temperature increase during step (3) makes it possible to improve the degree of progress of the polycondensation reaction by transesterification and thus to increase the molecular mass of the final polycarbonate obtained, said polycarbonate moreover having a weaker coloration than when all of step (3) of the process is performed at its highest temperature.

Needless to say, it is preferred to perform step (3) under an inert atmosphere, for example under nitrogen.

Using the standard processes generating phenol during the transesterification condensation reaction, it is necessary, in order to be able to remove this phenol from the reaction medium, to perform the entire reaction under vacuum. To remove the alcohols generated during the process according to the invention, the vacuum in the reactor is not necessary, since the alcohols generated can be distilled off more easily than phenol.

The process according to the invention thus has the advantage that the step of polycondensation by transesterification does not necessarily take place under a high vacuum. Thus, according to a variant of the process of the invention, at least part of step (3) is performed at a pressure ranging from 30 kPa to 110 kPa, advantageously from 50 to 105 kPa and preferentially from to 105 kPa, for example at atmospheric pressure. Preferentially, at least half of the total duration of step (3) is performed at this pressure.

However, step (3) may be entirely or partly performed under a higher slightly vacuum, for example with a pressure inside the reactor of between 100 Pa and 20 kPa. Obviously, this vacuum is adjusted according to the temperature inside the reactor and the degree of polymerization: when the degree of polymerization is low, in the event of an excessively low pressure and an excessively high temperature, the reaction cannot proceed correctly since the monomers are extracted from the reactor by distillation. This step under a slightly higher vacuum may be performed at the end of the reaction, which furthermore makes it possible to remove some of the residual species.

By way of example, the process may be performed by performing the following different successive steps:
  a first step for 2 hours 30 minutes at 170° C. at atmospheric pressure;
  a second step for 1 hour at 200° C. at atmospheric pressure;
  a third step for 1 hour at 220° C. at atmospheric pressure;
  a fourth step for 1 hour at 235° C. at atmospheric pressure;
  a fifth step for 1 hour at 235° C. at a pressure of about 300 Pa.

The reactor is generally equipped with a means for removing the alcohols generated during the polycondensation reaction by transesterification, for example a distillation head connected to a condenser.

The reactor is generally equipped with a stirring means such as a stirring system with paddles.

Monomers (A) and (B) react together randomly during step (3). When a single introduction of monomer (B) is performed, a polycarbonate with a random distribution of the diols (B) in the polymer is thus obtained. However, it is possible to perform one or more additional steps of introduction of monomers (B), after starting the condensation transesterification step (3).

The process may be performed in a batch manner, in a continuous manner, or in a semi-continuous semi-batch manner.

The polycarbonate formed during the process in step (4) is recovered. This polycarbonate may be transformed directly in the form of granules with the aid of a granulator, or in any other form. It is also possible to perform purification of the polymer thus obtained in a step subsequent to step (4), for example by dissolving the polymer in a solvent such as chloroform and then precipitation by adding a nonsolvent such as methanol.

The glass transition temperature of the polycarbonate formed is greater than or equal to 50° C. The glass transition temperature of the polycarbonate may be adjusted by selecting the synthesis conditions during the process. The Applicant has thus observed that by selecting a mole ratio of the monomers (A)/(B) substantially equal to 1, it is possible to obtain polycarbonates having the highest glass transition temperatures. When the conditions depart from equimolarity (A/B=1), the glass transition temperature decreases. The glass transition temperature also varies very significantly with the nature of the monomer (B). Specifically, if it is desired to obtain a polycarbonate having a substantially high temperature, it is preferred to use, at least partly, cyclic diols rather than linear diols.

The glass transition temperature may be measured by differential calorimetric analysis. For example, a Mettler DSC 30 type machine is used, equipped with aluminum crucibles, calibrated in temperature and heat flux with indium (for example ref. 119441). About 15 mg of the sample are weighed out in a pierced aluminum crucible. The process may be performed in the following manner:
  The crucible is placed in the oven under a stream of nitrogen, at a temperature of 25° C.
  A rapid cooling ramp is applied from 25° C. to −100° C.
  A heating ramp at 10° C./min is applied from −100° C. to 200° C.
  A new rapid cooling ramp is applied from 200° C. to −100° C.
  A second heating ramp is applied at 10° C./min from −100° C. to 200° C.
  The glass transition temperature is given by the temperature of the midpoint, according to the 3-tangent method.

By virtue of the process of the invention, it is possible to obtain a mass yield, defined by the ratio of the mass of polycarbonate recovered to the mass of the sum of the monomers used, of greater than or equal to 40%, advantageously greater than 50% and preferably greater than 55%.

Embodiments will now be detailed in the examples that follow. It is pointed out that these illustrative examples do not in any way limit the scope of the present invention.

EXAMPLES

Preparation of the Monomers

Isosorbide dimethyl carbonate (monomer A) and isosorbide dimethyl carbonate dimer (monomer C), which are useful in the polycarbonate manufacturing process according to the invention, are obtained according to the protocols described below.

Synthesis 1

800 g of isosorbide (5.47 mol) and then 9862 g of dimethyl carbonate (=20 equivalents of dimethyl carbonate) and 2266 g of potassium carbonate are introduced into a 20 liter reactor, heated via a bath thermostatically maintained with heat-exchange fluid, equipped with a mechanical stirring system with paddles, a system for controlling the temperature of the reaction medium and a rectification column mounted on a reflux head. The reaction mixture is heated for one hour at full reflux, after which time the temperature of the column head vapors reaches 64° C., before commencing the removal of the methanol formed. Heating of the reaction medium is then maintained at a temperature of between 68° C. and 75° C. for 13 hours, after which time the temperature of the column head vapors reaches 90° C. and stabilizes at this temperature (boiling point of dimethyl carbonate). This is the sign that the transesterification reaction is complete and that no more methanol is being formed. The reaction medium is filtered in order to remove the potassium carbonate in suspension therefrom. After distilling off the excess dimethyl carbonate, a white solid is recovered, which contains 91.5% isosorbide dimethyl carbonate (IDMC) and 8.5% of dimers, these percentages being determined by GC. The solid is free of unreacted isosorbide.

Synthesis 2

Synthesis 1 is repeated, the only difference being that equivalents of dimethyl carbonate are used. After distilling off the excess dimethyl carbonate, a white solid is recovered, which contains 79% of isosorbide dimethyl carbonate (IDMC) and 21% of dimers, these percentages being determined by GC. The solid is free of unreacted isosorbide.

Synthesis 3

A portion of the product obtained in synthesis 1 is distilled under high vacuum (<1 mbar) on a scraped-film evaporator in "short-patch" configuration. The evaporator is heated to 140° C. and the product is introduced at 70° C. with a flow rate of 140 g/h.

The distillate obtained is a white solid containing 100% by weight of isosorbide dimethyl carbonate and not containing any trace of dimers.

Preparation of Polycarbonates

Example 1

42.5 g (0.162 mol) of isosorbide dimethyl carbonate (A), 23.7 g (0.162 mol) of isosorbide (B), i.e. an (A)/(B) mole ratio of 1/1, and 0.0112 g ($1.62 \times 10^{-4}$ mol) of 1,2,4-triazole are placed in a 100 ml reactor, heated with a bath thermostatically maintained with a heat-exchange fluid, equipped with a mechanical stirring system with paddles, a system for controlling the temperature of the reaction medium, a nitrogen inlet tube, a distillation head connected to a condenser and to a container for receiving the condensates, and a regulated vacuum system. The installation is placed under an atmosphere of nitrogen and the reaction medium is heated by means of the heat-exchange fluid. The temperature is gradually increased in stages of 2 hours 30 minutes at 170° C., 1 hour at 200° C., 1 hour at 220° C. and 1 hour at 235° C. The temperature increase between each stage takes place over 30 minutes. In the course of the reaction, distillation of the methanol is observed. At the end of the 235° C. stage, the installation is placed under vacuum for 1 hour (residual pressure below 300 pascals), while maintaining the temperature at 235° C., so as to continue the distillation and to remove the residual low molecular weight species. After cooling the reaction medium, a polymer with a glass transition temperature of 90° C. is obtained.

The operating conditions are collated in table 1 below.

Example 2

Example 1 is repeated, the only difference being that the isosorbide dimethylcarbonate (A) contains 21% by weight of dimers (C), conserving an ((A)+(C))/(B) mole ratio of 1/1.

A polymer with a glass transition temperature of 120° C. is obtained.

The operating conditions are collated in table 1 below.

Example 3

Example 2 is repeated, the only difference being that the isosorbide is replaced with isoidide, while conserving an ((A)+(C))/(B) mole ratio of 1/1.

A polymer with a glass transition temperature of 85° C. is obtained.

The operating conditions are collated in table 1 below.

Example 4

Example 2 is repeated, the only difference being that the isosorbide is replaced with isomannide, while conserving an ((A)+(C))/(B) mole ratio of 1/1.

A polymer with a glass transition temperature of 93° C. is obtained.

The operating conditions are collated in table 1 below.

Example 5

Example 2 is repeated, the only difference being that the isosorbide is replaced with 1,4-cyclohexanedimethanol (1,4 CHDM), while conserving an ((A)+(C))/(B) mole ratio of 1/1.

A polymer with a glass transition temperature of 51° C. is obtained.

The operating conditions are collated in table 1 below.

Example 6

Comparative

Example 2 is repeated, the only difference being that the isosorbide is replaced with triethylene glycol, while conserving an ((A)+(C))/(B) mole ratio of 1/1.

A polymer with a glass transition temperature of −1° C. is obtained.

The operating conditions are collated in table 1 below.

Example 7

Comparative

Example 2 is repeated, the only difference being that the isosorbide is replaced with ethylene glycol, while conserving an ((A)+(C))/(B) mole ratio of 1/1.

A polymer with a glass transition temperature of 20.5° C. is obtained.

The operating conditions are collated in table 1 below.

TABLE 1

| examples | (B) | % m (C)/ ((A) + (C)) | $T_g$ (° C.) |
|---|---|---|---|
| 1 | isosorbide | 0 | 90 |
| 2 | isosorbide | 21 | 120 |
| 3 | isoidide | 21 | 85 |
| 4 | isomannide | 21 | 93 |

TABLE 1-continued

| examples | (B) | % m (C)/ ((A) + (C)) | $T_v$ (° C.) |
|---|---|---|---|
| 5 | 1,4 CHDM | 21 | 51 |
| 6 | triethylene glycol | 21 | −1 |
| 7 | ethylene glycol | 21 | 20.5 |

Example 8

Comparative 93.0 g (0.343 mol) of a mixture of 91.5% by weight of isosorbide dimethyl carbonate (A) and 8.5% by weight of dimers (C), 21.2 g (0.342 mol) of ethylene glycol (B), i.e. an ((A)+(C))/(B) mole ratio of 1/1, and 0.0067 g (2.05×10$^{-5}$ mol) of cesium carbonate, i.e. 0.006 mol % relative to (A)+(C), are placed in a reactor identical to that used in example 1. The installation is placed under a nitrogen atmosphere and the reaction medium is heated via the heat-exchange fluid. The temperature is gradually raised in stages of 2 h 30 minutes at 170° C., 1 hour at 200° C., 1 hour at 220° C. and 1 hour at 235° C. The temperature increase between each stage takes place over 30 minutes. In the course of the reaction, distillation of the methanol is observed. At the end of the 235° C. stage, the installation is placed under vacuum for 1 hour (residual pressure below 300 pascals), while maintaining the temperature at 235° C., so as to continue the distillation and to remove the residual low molecular weight species. After cooling the reaction medium, a polymer with a glass transition temperature of 31.5° C. is obtained.

The operating conditions are collated in table 2 below.

Example 9

Example 8 is repeated, the only difference being that the ethylene glycol is replaced with an 80/20 molar mixture of ethylene glycol/isosorbide, while conserving an ((A)+(C))/(B) mole ratio of 1/1.

A polymer with a glass transition temperature of 50° C. is obtained.

The operating conditions are collated in table 2 below.

Example 10

Example 8 is repeated, the only difference being that the ethylene glycol is replaced with a 50/50 molar mixture of ethylene glycol/isosorbide, while conserving an ((A)+(C))/(B) mole ratio of 1/1.

A polymer with a glass transition temperature of 76.5° C. is obtained.

The operating conditions are collated in table 2 below.

Example 11

Example 8 is repeated, the only difference being that the ethylene glycol is replaced with a 20/80 molar mixture of ethylene glycol/isosorbide, while conserving an ((A)+(C))/(B) mole ratio of 1/1.

A polymer with a glass transition temperature of 112.5° C. is obtained.

The operating conditions are collated in table 2 below.

Example 12

Example 8 is repeated, the only difference being that ethylene glycol is replaced with isosorbide, while conserving an ((A)+(C))/(B) mole ratio of 1/1.

A polymer with a glass transition temperature of 145° C. is obtained.

The operating conditions are collated in tables 2 and 3 below.

Example 13

Example 8 is repeated, the only difference being that the ethylene glycol is replaced with 1,4-CHDM, while conserving an ((A)+(C))/(B) mole ratio of 1/1.

A polymer with a glass transition temperature of 68° C. is obtained.

The operating conditions are collated in table 2 below.

TABLE 2

| Examples | (B) | $T_v$ (° C.) |
|---|---|---|
| 8 | ethylene glycol | 32 |
| 9 | 80% ethylene glycol –20% isosorbide | 50 |
| 10 | 50% ethylene glycol –50% isosorbide | 77 |
| 11 | 20% ethylene glycol –80% isosorbide | 113 |
| 12 | isosorbide | 145 |
| 13 | 1,4 CHDM | 77 |

Example 14

Example 12 is repeated, the only difference being that 1,2,4-triazole is used as catalyst, in proportions of 0.1 mol % relative to (A)+(C), while maintaining an ((A)+(C))/(B) mole ratio of 1/1.

A polymer with a glass transition temperature of 130° C. is obtained.

The operating conditions are collated in table 3 below.

Example 15

Example 12 is repeated, the only difference being that tetramethylammonium hydroxide (0.1 mol % relative to the isosorbide dimethyl carbonate) is used as catalyst, while maintaining an ((A)+(C))/(B) mole ratio of 1/1.

A polymer with a glass transition temperature of 115° C. is obtained.

The operating conditions are collated in table 3 below.

Example 16

Example 12 is repeated, the only difference being that an ((A)+(C))/(B) mole ratio of 0.8/1 is used.

A polymer with a glass transition temperature of 125° C. is obtained.

The operating conditions are collated in table 3 below.

Example 17

Example 12 is repeated, the only difference being that an ((A)+(C))/(B) mole ratio of 1.25/1 is used.

A polymer with a glass transition temperature of 140° C. is obtained.

The operating conditions are collated in table 3 below.

Example 18

Example 17 is repeated, the only difference being that a molar percentage of catalyst of 0.004% is introduced, while conserving an ((A)+(C))/(B) mole ratio of 1.25/1.

A polymer with a glass transition temperature of 134° C. is obtained.

The operating conditions are collated in table 3 below.

Example 19

Example 17 is repeated, the only difference being that a molar percentage of catalyst of 0.002% is introduced, while conserving an ((A)+(C))/(B) mole ratio of 1.25/1.

A polymer with a glass transition temperature of 127° C. is obtained.

The operating conditions are collated in table 3 below.

TABLE 3

| Examples | Nature of the catalyst | ((A) + (C))/ (B) mole ratio | catalyst/ (A) + (C) mol % | $T_v$ (° C.) |
|---|---|---|---|---|
| 12 | Cesium carbonate | 1.0 | 0.006 | 145 |
| 14 | 1,2,4-triazole | 1.0 | 0.1 | 130 |
| 15 | Tetramethyl-ammonium hydroxide | 1.0 | 0.1 | 115 |
| 16 | Cesium carbonate | 0.8 | 0.006 | 125 |
| 17 | Cesium carbonate | 1.25 | 0.006 | 140 |
| 18 | Cesium carbonate | 1.25 | 0.004 | 134 |
| 19 | Cesium carbonate | 1.25 | 0.002 | 127 |

It is found that the glass transition temperature of the polycarbonate of example 12, using an equimolar ratio of A and B, is higher than those of Examples 16 and 17, using an (A)/(B) ratio equal to 0.8 and 1.25, respectively.

It is also found that the glass transition temperature increases globally with the amount of catalyst.

Example 20

71.6 g (0.796 mol) of dimethyl carbonate (DMC), 113.5 g (0.777 mol) of isosorbide (B), i.e. a DMC/isosorbide mole ratio of 1.024/1, and 0.015 g (4.6×10$^{-5}$ mol) of cesium carbonate (i.e. 0.006 mol % relative to the isosorbide), are placed in a reactor identical to that used in example 1. The installation is placed under a nitrogen atmosphere and the reaction medium is heated via the heat-exchange fluid. The temperature is gradually raised in stages of 1 hour at 80° C., 2 hours 30 minutes at 170° C., 1 hour at 200° C. and 1 hour at 235° C. The temperature increase between each stage takes place over 30 minutes. In the course of the reaction, distillation of the methanol is observed. At the end of the 235° C. stage, the installation is placed under vacuum for 30 minutes (residual pressure below 300 pascals), while maintaining the temperature at 235° C., so as to continue the distillation and to remove the residual low molecular weight species. After cooling the reaction medium, a polymer with a glass transition temperature of 116.5° C. is obtained.

The mass yield obtained for the synthesis is 17%.
The operating conditions are collated in table 4 below.

Example 21

Example 20 is repeated, the only difference being that the isosorbide is replaced with a 50/50 molar mixture (B) of 1,4 CHDM/isosorbide, while conserving a DMC/(isosorbide+ CHDM) mole ratio of 1.025/1. A polymer with a glass transition temperature of −28° C. is obtained.

The mass yield obtained for the synthesis is 15%.

Example 22

Example 20 is repeated, the only difference being that the stage of 1 hour at 80° C. is replaced with a stage of 3 hours at 80° C. A polymer with a glass transition temperature of 70.5° C. is obtained.

The mass yield obtained for the synthesis is 18.5%.

TABLE 4

| examples | (B) | Duration of the stage at 80° C. | $T_v$ (° C.) | % mass yield |
|---|---|---|---|---|
| 20 | isosorbide | 1 hour | 116.5 | 17 |
| 21 | 50% isosorbide-50% CHDM | 1 hour | −28 | 15 |
| 22 | isosorbide | 3 hours | 70.5 | 18.5 |

Test 20 shows that by using a process for obtaining polycarbonate by reacting dianhydrohexitol and a dialkyl carbonate, a polycarbonate with a high glass transition temperature may be obtained. However, the yield for this process is very low, which is prohibitive for use in an industrial process.

Even by increasing the manufacturing times of the polymer, it is not possible to satisfactorily increase this yield. Test 22 even shows that this time increase has a negative impact on the glass transition temperature of the polycarbonate obtained.

Furthermore, when an additional cyclic diol other than dianhydrohexitols such as CHDM is used, the polycarbonate formed has in all cases a very low glass transition temperature.

Example 23

67 g (0.256 mol) of isosorbide dimethyl carbonate (A) 36.9 g (0.256 mol) of 1,4 CHDM (B), i.e. an (A)/(B) mole ratio of 1/1, and 0.0050 g (1.53×10$^{-5}$ mol) of cesium carbonate, i.e. 0.006 mol % relative to (B), are placed in a reactor identical to that used in example 1. The installation is placed under a nitrogen atmosphere and the reaction medium is heated via the heat-exchange fluid. The temperature is gradually raised in stages of 1 hour at 80° C., 2 hours 30 minutes at 170° C., 1 hour at 200° C. and 1 hour at 235° C. The temperature increase between each stage takes place over 30 minutes. In the course of the reaction, distillation of the methanol is observed. At the end of the 235° C. stage, the installation is placed under vacuum for 1 hour (residual pressure below 300 pascals), while maintaining the temperature at 235° C., so as to continue the distillation and to remove the residual low molecular weight species. After cooling the reaction medium, a polymer with a glass transition temperature of 61.0° C. is obtained.

The mass yield obtained for the synthesis is 64%.
The operating conditions are collated in table 5 below.

Example 24

Example 23 is repeated, the only difference being that the 1,4 CHDM is replaced with isosorbide (B), while conserving an A/B mole ratio of 1.025/1. A polymer with a glass transition temperature of 119° C. is obtained. The mass yield obtained for the synthesis is 59%.

TABLE 5

| examples | comonomer | (B) | $T_v$ (°C.) | % mass yield |
|---|---|---|---|---|
| 23 | Isosorbide dimethyl carbonate (A) | 1,4 CHDM | 61 | 64 |
| 24 | Isosorbide dimethyl carbonate (A) | isosorbide | 119 | 59 |

These tests show that with the aid of the process according to the invention, polycarbonates with a high glass transition temperature may be obtained, while at the same time obtaining an excellent polycondensation yield, by using a process using dianhydrohexitol dialkyl carbonates instead of dianhydrohexitol dialkyl carbonate. Using the same polycondensation conditions, these tests show that the yield may be tripled or even quadrupled in this manner (59% for test 24 instead of 17% for test 20, and 64% for test 23 instead of 15% for test 21).

Furthermore, the glass transition temperature of the polymers obtained is higher. This is particularly notable for polycarbonates using additional diols in addition to the dianhydrohexitols (61° C. instead of −28° C.)

The invention claimed is:

1. A process for manufacturing a polycarbonate with a glass transition temperature of greater than or equal to 50° C., comprising:
    a step (1) of introducing, into a reactor, a monomer (A) of formula:

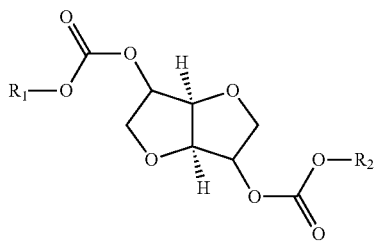

R1 and R2 being identical or different alkyl groups;
    a step (2) of introducing, into the reactor, at least one cyclic diol or a mixture of diols (B) comprising at least 20 mol % of cyclic diols;
    a step (3) of polycondensation by transesterification of the mixture comprising monomers (A) and (B); and
    a step (4) of recovering the polycarbonate formed in step (3).

2. The process of claim 1, wherein the alkyl groups R1 and R2 comprise from 1 to 10 carbon atoms.

3. The process of claim 1, wherein (B) is a mixture of diols comprising, relative to the total number of diols, at least 50 mol % of a cyclic diol or of a mixture of cyclic diols.

4. The process of claim 1, wherein the at least one cyclic diol(s) are selected from the group consisting of:
    bisphenols such as 2,2-bis(4-hydroxyphenyl)propane (bisphenol A), 2,2-bis(3,5-dimethyl-4-hydroxyphenyl)propane, bis(4-hydroxyphenyl)methane (bisphenol F), 1,1-bis(4-hydroxyphenyl)cyclohexane (bisphenol C), and 1,1-bis(4-hydroxyphenyl)ethane (bisphenol AD);
    dianhydrohexitols such as isosorbide, isomannide and isoidide;
    cyclohexanedimethanols such as 1,2-cyclohexanedimethanol, 1,3-cyclohexanedimethanol and 1,4-cyclohexanedimethanol;
    tricyclodecanedimethanols;
    pentacyclopentanedimethanols;
    decalindimethanols such as 2,6-decalindimethanol, 1,5-decalindimethanol and 2,3-decalindimethanol;
    norbornanedimethanols such as 2,3-norbornanedimethanol and 2,5-norbornanedimethanol;
    adamantanedimethanols such as 1,3-adamantanedimethanol;
    cyclohexanediols such as 1,2-cyclohexanediol, 1,3-cyclohexanediol and 1,4-cyclohexanediol;
    tricyclodecanediols;
    pentacyclopentadecanediols;
    decalindiols;
    norbornanediols; and
    adamantanediols.

5. The process of claim 1, wherein the at least one cyclic diol is isosorbide, isomannide, isoidide, 1,2-cyclohexanedimethanol, 1,3-cyclohexanedimethanol, or 1,4-cyclohexanedimethanol.

6. The process of claim 1, further comprising a step (1') of introducing, into the reactor, a monomer (C) of formula:

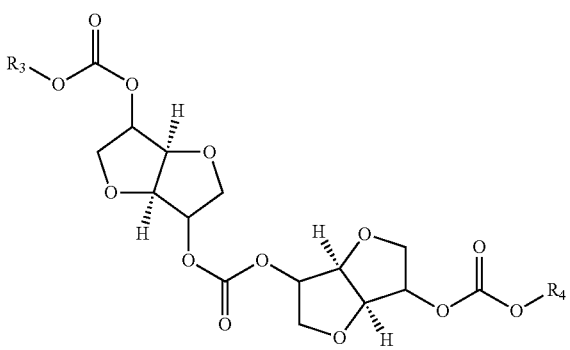

R3 and R4 being identical or different alkyl groups comprising from 1 to 10 carbon atoms.

7. The process of claim 1, wherein the monomer (A) is an isosorbide dialkyl carbonate.

8. The process of claim 6, wherein the molar amounts of monomers (A), (B) and (C) introduced are, relative to their total number:
    from 1% to 60% of (A);
    from 40% to 60% of (B); and
    from 0% to 39% of (C),
    the sum of (A), (B) and (C) being 100%.

9. The process of claim 6, wherein the monomers (A), (B) and (C) constitute more than 90 mol % of the total amount of monomers introduced into the reactor.

10. The process of claim 1, wherein step (3) takes place in the presence of a transesterification catalyst.

11. The process of claim 10, wherein the catalyst comprises at least one of an alkali metal ion, an alkaline earth metal ion, a cyclic nitrogen compound, a quaternary ammonium ion, a quaternary phosphonium ion, a basic boron-based compound, or a basic phosphorous-based compound.

12. The process of claim 10, wherein the molar amount of the catalyst is in a range of from $10^{-7}$% to 1%, relative to the amount of (A) and (C).

13. The process of claim 1, wherein at least part of step (3) is performed at a temperature in a range of from 100° C. to 250° C.

14. The process as claimed in of claim 1, wherein at least part of step (3) is performed at a pressure in a range of from 30 kPa to 110 kPa.

15. The process of claim 1, wherein the polycarbonate recovered in step (4) has a glass transition temperature in a range of from 90° C. to 180° C. and preferably from 110° C. to 170° C.

16. The process of claim 1, wherein the alkyl groups R1 and R2 independently are methyl or ethyl groups.

17. The process of claim 1, wherein the at least one cyclic diol is isosorbide.

18. The process of claim 6, wherein the alkyl groups R3 and R4 independently are methyl or ethyl groups.

19. The process of claim 6, wherein the molar amounts of monomers (A), (B) and (C) introduced are, relative to their total number:

from 39% to 59% of (A);
from 40% to 60% of (B); and
from 1% to 10% of (C),
the sum of (A), (B) and (C) being 100%.

20. The process of claim 10, wherein the catalyst comprises cesium carbonate.

\* \* \* \* \*